April 21, 1964 V. J. HABISOHN 3,130,271

COMMUNICATION CLASSIFICATION SYSTEM

Filed Feb. 23, 1961

INVENTOR.
VICTOR J. HABISOHN

BY J. Warren Whitesel

ATTORNEY

United States Patent Office 3,130,271

Patented Apr. 21, 1964

3,130,271

COMMUNICATION CLASSIFICATION SYSTEM

Victor J. Habisohn, Oak Lawn, Ill., assignor to International Telephone and Telegraph Corporation, New York, N.Y., a corporation of Maryland Filed Feb. 23, 1961, Ser. No. 91,087

14 Claims. (Cl. 179—18)

The invention relates to communication systems having classified subscriber lines and more particularly to systems for giving an alarm indication if a security classification is broken or violated.

Very often it is necessary or desirable to classify subscriber lines in a telecommunication system and to give an alarm or perform another circuit function if such classification is broken or violated. For example, the subscriber lines of a telephone exchange or business establishment may be divided into those having restricted service, executive right-of-way, access to toll equipment, and the like. Similarly, the subscriber lines at a military base may be divided into top secret, secret, confidential, and unclassified. Regardless of the reason why the lines are classified it is necessary to detect the proper classification, to give the service required by such classification, and to perform a prescribed circuit function if the classification is broken or violated.

The problems of classifying lines and detecting security violations are especially complex when it is necessary to add classifications to existing communication systems and more particularly when such systems include a collection of different types of equipment. These problems are further compounded when it is necessary to classify lines served by both electromechanical and electronic equipment and especially when the electronic equipment uses different switching techniques. For example, existing electronic switching equipment uses time division multiplexing, space switching, and time controlled space switching techniques. Moreover, many existing systems include equipment which makes it very simple to violate classifications. For example, an eavesdropper may cut in on a busy line through use of a verification switch train normally used in toll switching, the talk or monitor keys of a switchboard, or a switch train normally used for testing subscriber lines. Quite obviously, therefore, circuits which overcome these and other problems involve many conflicting considerations which must be accommodated while economic considerations preclude the use of complicated and expensive apparatus.

Accordingly, an object of this invention is to provide new and improved communication classification systems and more particularly to provide means for detecting violations of security classifications. In this connection, an object of this invention is to detect simultaneous operation of a number of switches or switch trains for interconnecting a plurality of subscriber lines of different classifications in a single conversation connection.

A more specific object of this invention is to provide economical, low cost, means for detecting violations of security classifications, especially in existing switching systems. In this connection, an object is to provide an applique circuit using only standardized, low cost, readily available components, which may be added to existing telecommunication systems with a minimum amount of changes and without disrupting service in such systems.

In accordance with one aspect of this invention, the subscriber lines of a telecommunication system are divided into groups according to their classification, each classification being identified by an associated recurring time frame. When these subscriber lines are interconnected through a path in an automatic switching network, pulses are also sent over at least a portion of that same path during selected time frames to identify the classification of the interconnected lines. Therefore, if a would-be eavesdropper gains access to the interconnected subscriber lines by an unauthorized operation of another switching device, a pulse appears not only during the time frame identifying the classification of the interconnected lines, but also during the time frame identifying the classification of the eavesdropper's line. When a conflicting classification is thus indicated, an alarm condition is present and appropriate action is taken.

The above mentioned and other objects and features of this invention and the manner of obtaining them will become more apparent and the invention itself will be best understood by making reference to the following description of an embodiment of the invention taken in conjunction with the attached drawing in which.

Figures 1, 2, 3:
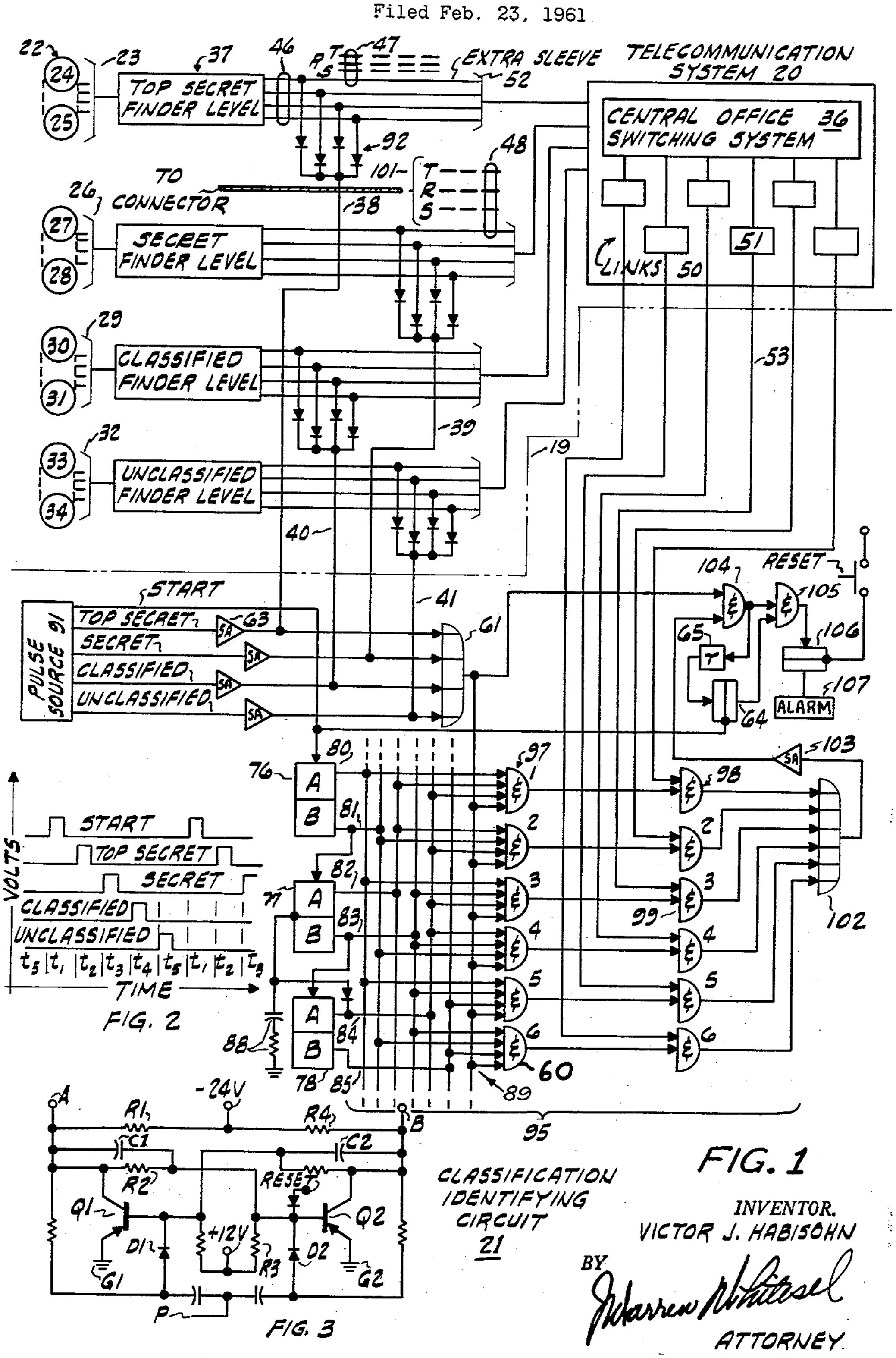
FIG. 1 is a circuit diagram showing the principles of the invention used in connection with an automatic switching network which, in this exemplary construction, is described as an automatic telephone type network.
FIG. 2 is a plot of time against volts showing the time frames used to identify the classification of subscriber lines.
FIG. 3 is a circuit diagram of a flip-flop circuit actually used in a binary counter shown in FIG. 1.

To facilitate an understanding of the invention, it is described hereinafter in connection with a telephone exchange. However, the invention has general application to any telecommunication system. In fact, it was actually used in one system which had no switching at all because the calling and called stations were permanently interconnected. The object was to find illegal cross connections between lines in the system. Also, for convenience of expression, the identified classifications are hereinafter referred to as "top secret," "secret," "confidential," and "unclassified." It should be understood, however, that the invention may be used any time that it is necessary to identify particular subscriber line classifications. Finally, the action taken in response to a violated classification is described herein as "signaling an alarm," whereas any other appropriate action may be taken also. Thus, the terms used and items described herein are not to be construed as limiting the invention to specific devices, but are to be construed as encompassing the full range of equivalents allowed under established principles of patent law.

GENERAL DESCRIPTION OF SYSTEM

FIG. 1 of the attached drawing shows a switching network of a telecommunication system 20 above and a classification identifying circuit 21 beneath a dot-dashed line 19. The circuit 21 is an applique which may be added to any existing equipment for checking on classification violations.

The telecommunication system 20 includes a number of subscriber lines 22 divided into groups according to their security classifications. Thus, the lines 23 serve stations 24, 25 which have a top secret classification; the lines 26 serve the stations 27, 28 which have a secret classification; the lines 29 serve the stations 30, 31 which have a classified classification; and the lines 32 serve the stations 33, 34 which have an unclassified classification.

Each subscriber line is given access to central office switching equipment 36 in any well known manner via initial switching networks 37, here called—but not necessarily limited to—finder levels, which are also divided into groups according to security classifications. For example, those familiar with step-by-step equipment will readily perceive how the lines may be tied into finder levels identified by individual level marking conductors 38–41, and those familiar with register controlled equipment will readily perceive how lines may be identified in the registers by special signals forwarded from originating switch stages. When the classification system of this invention was used in the communication system which did not contain any switching, the level markings were connected to the lines at points which were close enough to the calling stations to preclude an illegal cross connection before the level marking was applied to the lines.

Means are provided for transmitting classification indicating signals through at least a portion of the telecommunication path used to interconnect subscriber lines. More particularly, in the case of the top secret lines 23, for example, these signals are transmitted from the level marking conductor 38 to the central office switching system 36 via a number of interstage conductors 46. These conductors are here shown as the well known fourth wire or extra sleeve conductors. It will, therefore, be apparent that each extra sleeve has associated with it the well known combination of tip T, ring R, and sleeve S conductors, as indicated at 47, 48. Alternatively, the conductors 46 may be special control conductors, signal channels, dial legs, notched portions of an audio frequency spectrum, or the like. The important thing is not that a specific conductor or type of transmission channel is used, but that a means is provided for transmitting classification indicating markings through at least a portion of the path in the communication system actually used to extend a call. However, it should be noted that an advantage of using sleeve conductors is that existing equipment may be modified by an addition of the applique circuit 21 with a minimum amount of changes and without disrupting the telecommunication service.

For selectively interconnecting the various subscriber lines, a number of switching links 50 are provided in the central office switching system 36. Each of these links may contain any well known automatic switching equipment. Thus, if a subscriber at station 24 wishes to extend a call to station 27, for example, the circuit is completed via conductors 47, 48 and any preassigned link, such as link 51. The circuit for transmitting the classification indicating signals is completed via the level marking conductor 38, and the extra sleeve conductor 52 to the particular link 51 used during this call, and then to the classification identifying circuit 21 shown beneath the dot-dashed line 19 via conductor 53.

DETAILED DESCRIPTION OF CLASSIFICATION IDENTIFICATION CIRCUIT

Many of the components in the classification circuit 21 are standardized, low cost, readily available logic modules shown here by logic symbols. For example, an exemplary "AND" gate is shown at 60 by a semicircle including an ampersand. The simultaneous energization of all input conductors (marked by an arrowhead) causes a current flow through the output terminal.

An exemplary "OR" gate is shown at 61 by a semicircle having input conductors intersecting its chord. Energization of any input conductor (marked by an arrowhead) causes a corresponding current flow through the output terminal.

An exemplary switch amplifier is shown at 63 by a triangle including the letters SA. Normally, no current flows from the amplifier; however, when a pulse is applied to the input, the amplifier immediately saturates and a maximum current flows from the output for the duration of the pulse.

An exemplary flip-flip is shown at 64 by a rectangle having a bisecting line. If an input terminal (marked by an arrowhead) is energized, the flip-flip turns "on" to energize its output conductor, thus remembering the energizing signal. If a reset terminal (marked by a heavily inked dot) is energized, the flip-flip turns "off" to deenergize the output terminal, thus forgetting the energizing signal and remembering only the resetting signal.

A differentiating network is shown at 65 by a rectangle including a negative spike pulse. If the terminal marked by an arrowhead is energized, a very short negative or differentiated pulse appears at the other terminal. In this particular circuit, the differentiated pulse is produced by the trailing edge of the input pulse.

Finally, an exemplary flip-flop is shown at 76 by a rectangle divided into A and B parts. Either an A or B output terminal is energized originally. Thereafter, the energizing potential is switched to the other output terminal responsive to an energization of a trigger terminal (marked by an arrowhead). The process is repeated with each trigger pulse, thus producing output signals in the order A, B, A, B, A, etc. When a reset terminal (marked by a heavily inked dot) is pulsed, the output potential is switched to the B side regardless of the prior condition of the circuit.

The circuit actually used in a flip-flop of the type described is shown in FIG. 3 as including a pair of output terminals A, B, and a pair of transistors Q1, Q2, which may be PNP junction type devices. Each transistor has its emitter (indicated by an arrowhead showing the direction of positive current flow) connected to ground. The base bias for each transistor is established by a voltage divider connected between a (+)12 volt battery and a (−)24 volt battery. For example, the base bias for transistor Q2 is established by the voltage divider including resistors R1, R2, and R3, and more particularly by the potential at the junction between resistors R2, R3. If transistor Q1 is turned "on," its emitter ground G1 appears at the junction between resistors R1, R2 in lieu of the (−)24 volt battery. This ground holds the output terminal A at ground potential and causes the base of transistor Q2 to be positive relative to its emitter. A PNP device such as transistor Q2 turns "off" when so biased. With transistor Q2 turned "off" the (−)24 volt battery connected to the resistor R4 appears at terminal B.

The trigger terminal P of the flip-flop circuit of FIG. 3 is driven in positive and negative directions by a driving waveform. Thus, when this waveform makes terminal P positive, a positive potential is applied through diodes D1, D2 to the base electrodes of transistors Q1, Q2. Since transistor Q2 is assumed to be "off" and, further, since a positively biased base (relative to an emitter) turns "off" a PNP junction type device, there is no immediate effect at transistor Q2. On the other hand, the positive potential appearing at the base electrode of transistor Q1 turns it "off." Thus, the emitter ground G1 is removed from the junction between resistors R1, R2 and from the output terminal A. The output terminal A and the base electrode of transistor Q2 go to the negative potential applied by the (−)24 volt battery through the resistor R1. The transistor Q2 switches "on" to apply its emitter ground G2 to output terminal B and to remove the base drive current from transistor Q1 to hold it "off." The capacitors C1, C2 speed the transition periods while transistors Q1, Q2 switch "off" and "on" respectively.

The next positive going pulse appearing at trigger terminal P switches transistor Q2 "off" and transistor Q1 "on." Therefore, as each succeeding positive pulse in the driving waveform appears at terminal P, the output terminals A, B are energized alternately.

A binary counter is provided when the output terminal B of a stage is connected to the trigger terminal P of a succeeding stage. Therefore, during the times when the potential at output terminal B is going from negative to positive, a pulse is transmitted to switch the next stage. In this manner, a number of flip-flop stages are cascaded to provide a binary counter as shown at 76–78 (FIG. 1). Since each flip-flop has two (A, B) output conditions and since three flip-flops are used, the total binary count is the cube of two, or eight output pulses. Of course, the binary count may be increased or decreased by adding or subtracting flip-flop stages; however, the result is always a binary count cycle which is a power of two.

To change the binary count cycle to a number other than a power of two, the binary stages are selectively reset by signals fed back from a selected flip-flop output terminal to the base electrode of a transistor in a preceding stage. Thus, when the reset terminal of FIG. 3 is pulsed positively relative to the emitter ground G2, the transistor Q2 is switched or held "off," transistor Q1 is switched or held "on," the output terminal A is at the potential of ground G1, and the output terminal B is at the potential supplied by the (−)24 volt battery through resistor R4. A capacitor-resistor circuit 88 (FIG. 1) speeds the reset so that there is no appreciable time period between an operation of a binary counter and the reset resulting from that same operation. Thus, in the binary counter 76–78 there is a six step count cycle instead of the two cubed, or eight step cycle normally provided by three flip-flop stages.

With the foregoing description of the flip-flop circuit in mind and upon inspection of FIG. 1, it will be apparent that the cascaded circuits 76–78 drive each other "off" and "on" at intervals timed by the appearance of pulses on a conductor marked "START." More specifically, the A, B output conductors 80–85 are energized in the following manner [assuming that a grounded conductor equals (+) and a negatively energized conductor equals (−)]:

*Table 1*

| Number of pulses on the START Conductor | Condition of output conductors 80–85 | | | | | |
|---|---|---|---|---|---|---|
| | 80 | 81 | 82 | 83 | 84 | 85 |
| 1 | − | + | − | + | − | + |
| 2 | + | − | − | + | − | + |
| 3 | − | + | + | − | − | + |
| 4 | + | − | + | − | − | + |
| 5 (Reset) | − | + | + | − | + | − |
| 6 | + | − | + | − | + | − |
| 7 (Repeat 1) | − | + | − | + | − | + |

Thus, each pulse appearing on the "START" conductor is identified by a particular combination or binary code of energized A, B output conductors among the group 80–85 and the binary cycle repeats after six positive going start pulses have been counted. Moreover, this same combination of energized A, B output conductors appears on a number of common buses 89.

Means are provided for generating a cyclically recurring series of time frames. As here shown, the time frames are defined by the series of successive voltage pulses shown in FIG. 2. Specifically, for the four classifications described herein, there are five time frames, designated generally as time frames "$t_1$–$t_5$." During each time frame a voltage pulse is produced to identify a corresponding classification, i.e. a start pulse, a top secret pulse, a secret pulse, a classified pulse, and an unclassified pulse, in the order named. These pulses are individually applied to the corresponding output conductors of the pulse source 91, here shown as a hollow box. It is contemplated, however, that the pulse source 91 is already present in existing exchanges. For example, in time controlled electronic switching systems, the pulses may be produced by a scanner. In electromechanical systems, the pulses may be taken from an interrupter. Of course, well known counting apparatus may be used also. In any event, the "START" conductor and the four level marking conductors 38–41 are pulsed in repeated sequence, with pulses of uniform voltage provided by the switch amplifiers such as 63. The diodes such as 92 form an "OR" gate which prevents feedback between the extra sleeve conductors in the group 46 and similar diodes perform a similar function at other extra sleeve conductors.

Detector means 95 are connected to the links via conductors such as 53 to detect the time frame pulses as they occur. More specifically, this detector includes the binary counter 76–78, the buses 89, and two series of "AND" gates 97, 98. By comparing Table 1 above with the strapping between the "AND" gates 97 and the buses 89, it is seen that the "AND" gates 97 are sequentially energized (in the order numbered in the drawing). Moreover, the binary counters are advanced each time that a pulse is applied to the "START" conductor. Therefore, the upper three input terminals of the first "AND" gate in series 97 are energized after the first start pulse occurs at source 91 and during each classification pulse when "OR" gate 61 conducts and pulses the lowermost terminal of each "AND" gate is energized. Thus, the first gate conducts the time $t_2$ and energizes the lowermost input terminal of the first "AND" gate in series 98 to check the classification of calls extended through a first of links 50. After completion of five time frames, the start conductor is again pulsed, the binary counter advances, and the second "AND" gate in the series 98 is enabled to check the classification calls extended through a second link. In a similar manner each of the remaining "AND" gates is enabled to check the remaining links, and the cycle repeats.

Six "AND" gates are provided in each series 97, 98 because six links 50 are shown in the central office switching system. More or less "AND" gates may be provided in the series 97, 98 to accommodate larger or smaller switching systems. Each link is connected to an upper terminal of an individually associated "AND" gate in the series 98. Therefore, assuming that a call is extended over conductors 47 through link 51, to conductors 48, for example, the detector is enabled to detect the classification identifying pulses appearing on extra sleeve conductor 52 after the "START" conductor has been pulsed three times. This is because the binary counter 76–78 has advanced to energize the third "AND" gate in series 97 and because the classification identifying pulses are applied from link 51 over line 53 to the upper input of "AND" gate 99.

Normally the upper input of "AND" gate 99 is pulsed only once during the third binary count, and that is during the time frame which identifies the classification of the calling line 47. This upper input of gate 99 is not pulsed during the time frame which identifies the classification of called line 48 because the classification pulses are applied to the extra sleeve conductors via finder level markings extended over conductors 38–41 and these markings do not appear on the conductors of a connector, as indicated at 101. If the invention is used in systems which do not have the type of extra sleeve conductors, of course, it will be necessary to prevent the classification pulses of one of the conversing subscribers from pulsing "AND" gate 99. In like manner, all except one pulse are inhibited if the invention is used in a conference call system.

Assuming, therefore, that there has been no violation of classification, the "AND" gate 99 conducts during top secret time frame $t_2$, a pulse is applied through "OR" gate 102, and switch amplifier 103 to the lower input of an "AND" gate 104. Simultaneously therewith "OR" gate 61 conducts and energizes the upper input of "AND" gate 104. "AND" gate 104 conducts and pulses the upper input of "AND" gate 105 and the input of differentiating network 65. The lower input of "AND" gate 105 is not energized; therefore, no current flows to flip-flip 106.

At the trailing edge of the pulse from "AND" gate 104, differentiating network 65 conducts to trigger flip-flip 64 and energize the lower input of "AND" gate 105. It is too late for "AND" gate 105 to conduct, however, since the pulse at the upper input of "AND" gate 105 terminates before the lower input is energized. Since it is assumed that there is no violation of classification, no second pulse appears on conductor 53 before the start pulse reappears; the reset terminal of the flip-flip 64 is energized; and the energizing current at the lower input terminal of "AND" gate 105 is canceled. The binary counter steps on and the next link is checked for classification violation.

Means are provided for detecting a classification violation when two classification identifying pulses are transmitted through the same link. For example, both a general and his secretary may have top secret clearance. Thus, if he is at station 24 and she is at station 25, there is no indication of a classification violation if both stations are connected to link 51. On the other hand, a person having access via a switchboard, for example, may have only a secret clearance and there is a violation if a monitor key is operated to enable eaves-dropping. In a similar manner, a verification or test switch train may have an unclassified classification so that there is a violation if they are operated to seize link 51. In any event, the simultaneous seizure of a link from two or more differently marked finder levels causes at least a second pulse to be transmitted through "AND" gate 104 to the upper input of "AND" gate 105 after flip-flip 64 is triggered and before a start pulse appears to reset it. There is a coincidence at the inputs of "AND" gate 105 which triggers flip-flip 106 to signal an alarm condition at 107. The alarm condition continues until a reset key 108 is operated to reset flip-flip 106.

It is to be understood that the foregoing description of a specific embodiment of the invention is not to be construed as a limitation upon its scope.

I claim:

1. A system for giving telecommunication service to classified subscriber lines comprising means for transmitting pulses through at least a portion of said system during time frames which identify the classification of a subscriber line extended through said system, and means responsive to the detection of a pulse during one of the time frames which does not correspond to the classification of said extended line for signaling an alarm condition.

2. A system for extending telecommunication paths between classified subscriber lines comprising means for transmitting pulses through at least a portion of said system during time frames which identify the classification of one subscriber line included in each communication path extended through said system, and means responsive to the detection of two or more of said transmitted pulses extended through the same communication path for signaling an alarm condition.

3. A telecommunication classification system comprising a plurality of subscriber lines divided into groups according to their classifications, means for generating a cyclically recurring series of time frames, means for assigning at least some of said time frames for individually identifying a corresponding one of said classifications, means for interconnecting said subscriber lines, detector means, means including at least a portion of said interconnecting means for transmitting pulses to said detector means during time frames which identify the classification of at least one of said interconnected lines, and means responsive to detection of a pulse during an incorrect time frame for signaling an alarm condition.

4. A telecommunication classification system comprising a plurality of classified subscriber lines, means for generating classification indicating signals during individual time frames which identify the classifications of said lines, means for selectively interconnecting said subscriber lines in a communication path, means including at least a portion of said path for transmitting said signals during time frames which identify the classification of one of said lines connected in said communication path, and means responsive to detection of signals transmitted over said portion of said path during two or more of said time frames for signaling an alarm condition.

5. A system for giving telecommunication service to classified subscriber lines comprising a plurality of initial switching networks marked according to the classification of said lines, means for selectively extending subscriber lines through said system via tip, ring, and at least one sleeve conductors, means for transmitting pulses via said level markings and said sleeve conductors during time frames which identify the classification of associated subscriber lines, and means responsive to the detection of a pulse transmitted during a time frame which does not correspond to the classification of said extended line for signaling an alarm condition.

6. A system for giving telecommunication service to classified subscriber lines comprising a plurality of initial switching networks marked according to the classification of said lines, means for selectively extending said subscriber lines through said system via paths including at least one control conductor per path, means for transmitting pulses through at least a portion of said path via said level markings and said conductors during time frames which identify the classification of associated subscriber lines, and means responsive to the detection of pulses transmitted during two or more of said time frames for signaling an alarm condition.

7. A system for giving telecommunication service to classified subscriber lines comprising initial switching networks marked according to the classification of said lines, a plurality of switching link circuits, said lines being accessed to said links via said initial network according to the classification of said lines, each of said lines comprising tip, ring, and at least one sleeve conductors, means for generating cyclically recurring time frames, each time frame indicating a corresponding classification, means for transmitting pulses through said network markings to said link circuits via said sleeve conductors during time frames which identify the classification of a calling subscriber line, means associated with said sleeve conductors for detecting the time frames during which said transmitted pulses appear, and means responsive to the detection of pulses during two or more of said time frames for signaling an alarm condition.

8. A system for giving telecommunication service to classified subscriber lines comprising a plurality of finder levels grouped according to the classifications of said lines, a plurality of central office switching link circuits, said lines being accessed to said links via said finder levels according to the classification of said lines, means for selectively extending a subscriber line through one of said links, each of said extended lines comprising tip, ring, and at least one sleeve conductors, means for generating cyclically recurring time frames, each time frame indicating a corresponding classification, means for transmitting pulses through at least a portion of said one link circuit via said sleeve conductor during a selected one of the time frames which identifies the classification of the subscriber line extended therethrough, means associated with said links for detecting the time frame during which said transmitted pulse appears, and means responsive to the detection of a pulse during a time frame which does not correspond to the classification of said extended line for signaling an alarm condition.

9. An applique circuit for use in a telecommunication system comprising a source of cyclically recurring pulses at least one of which is a recurring start pulse, a binary counter driven by said start pulses, means selectively energized during the steps in the count cycle of said binary counter for checking on classification violations in said system, means for transmitting other of said pulses through said system to said last named means, and means responsive to detection of an incorrectly transmitted one of said pulses for signaling an alarm condition.

10. The circuit of claim 9 wherein said alarm signaling means is operated responsive to detection of two or more of said transmitted pulses during any one step in said count cycle.

11. A system for giving telecommunication service to classified subscriber lines comprising a plurality of initial switching networks marked according to the classification of said lines, means for selectively extending a subscriber line through said system, an applique circuit for checking on classification violations comprising a source of cyclically recurring pulses at least one of which is a recurring start pulse, means effective after each of said start pulses for sequentially causing said applique circuit to transmit selected other of said pulses through said system to identify the classification of said lines, means in said applique circuit for detecting the number of said other pulses transmitted through said system during each interval between said start pulses, and means responsive to the detection of two or more pulses transmitted during any of said intervals for signaling an alarm condition.

12. A system for giving telecommunication service to classified subscriber lines comprising a plurality of initial switching networks marked according to the classification of said lines, means for selectively extending a subscriber line through said system via at least one control channel, an applique circuit for checking on classification violations comprising a source of cyclically recurring pulses at least one of which is a recurring start pulse, a binary counter driven by said start pulses, means selectively energized during the steps in the count cycle of said binary counter for sequentially enabling said applique circuit, means also energized during said steps in said count cycle for transmitting other of said pulses through said system via said markings and said control channels to said applique circuit during time frames which identify the classification of associated subscriber lines, and means responsive to the detection of a pulse transmitted during a time frame which does not correspond to the classification of said extended line for signaling an alarm condition.

13. The system of claim 12 and means whereby said means for signaling an alarm condition is operated responsive to an appearance of at least two of said transmitted pulses during one step in said count cycle.

14. A system for giving telecommunication service to classified subscriber lines comprising a plurality of initial switching networks marked according to the classification of said lines, means including a number of link circuits for selectively extending a subscriber line through said system via at least one control channel, an applique circuit for checking on classification violations in said system comprising a source of cyclically recurring pulses at least one of which is a recurring start pulse, a binary counter driven by said start pulses, means selectively energized during each of the steps in the count cycle of said binary counter for sequentially connecting said applique circuit to each of said link circuits in turn, said applique circuit being effectively coupled to a different one of said links on each of said steps, means also energized during said steps in said count cycle for transmitting other of said pulses through said system via said markings, said control channel, and one of said links to said applique circuit during time frames which identify the classification of associated subscriber lines, and means responsive to the detection of two or more of said pulses transmitted through any one of said links for signaling an alarm condition.

References Cited in the file of this patent

UNITED STATES PATENTS

| | | |
|---|---|---|
| 1,991,383 | Fator | Feb. 19, 1935 |
| 2,333,474 | Denton et al. | Nov. 2, 1943 |
| 2,496,642 | Shann | Feb. 9, 1950 |
| 2,947,819 | Brightman | Apr. 2, 1960 |
| 2,979,570 | Brightman | Apr. 11, 1961 |